United States Patent
Langdon et al.

(12) 
(10) Patent No.: US 10,832,281 B1
(45) Date of Patent: Nov. 10, 2020

(54) SYSTEMS, APPARATUS, AND METHODS FOR PROVIDING PROMOTIONS BASED ON CONSUMER INTERACTIONS

(71) Applicant: Groupon, Inc., Chicago, IL (US)

(72) Inventors: Daniel Langdon, Santiago (CL); Gaston L'Huillier, San Francisco, CA (US)

(73) Assignee: GROUPON, INC., Chicago, IL (US)

( * ) Notice: Subject to any disclaimer, the term of this patent is extended or adjusted under 35 U.S.C. 154(b) by 746 days.

(21) Appl. No.: 14/579,964

(22) Filed: Dec. 22, 2014

Related U.S. Application Data

(60) Provisional application No. 61/919,641, filed on Dec. 20, 2013.

(51) Int. Cl.
*G06Q 30/02* (2012.01)

(52) U.S. Cl.
CPC ................ *G06Q 30/0251* (2013.01)

(58) Field of Classification Search
CPC .................................... G06Q 30/0251
USPC ..................................... 705/14.13
See application file for complete search history.

(56) References Cited

U.S. PATENT DOCUMENTS

| | | | |
|---|---|---|---|
| 2010/0262602 A1* | 10/2010 | Dumon | G06F 17/30979 707/728 |
| 2014/0180790 A1* | 6/2014 | Boal | G06Q 30/0245 705/14.42 |
| 2015/0006280 A1* | 1/2015 | Ruiz | G06Q 30/00 705/14.45 |

* cited by examiner

*Primary Examiner* — Azam A Ansari
(74) *Attorney, Agent, or Firm* — Alston & Bird LLP

(57) ABSTRACT

Systems, apparatus, and methods for providing promotions based on consumer interaction data are discussed herein. Some embodiments may include a system and/or apparatus including circuitry configured to provide electronic user interfaces (or impressions) of promotions to consumer devices and receive consumer interaction data indicating consumer interaction with the impressions. The system may be further configured to determine a selected promotion for providing in a subsequent impression based on the consumer interaction data. For example, the system may be configured to determine a promotion score of available promotion based on consumer interaction data indicating consumer responses to the available impressions. The promotion score may provide a rating by which available promotions may be selected and may be determined based on various criteria discussed herein to provide selected promotions to consumer devices.

19 Claims, 9 Drawing Sheets

SYSTEMS, APPARATUS, AND METHODS FOR PROVIDING PROMOTIONS BASED ON CONSUMER INTERACTIONS

CROSS REFERENCE TO RELATED APPLICATIONS

This application claims the benefit of U.S. Provisional Application No. 61/919,641, titled "Systems, Apparatus, And Methods for Providing Promotions Based on Consumer Interactions," filed Dec. 20, 2013, which is incorporated by reference herein in its entirety.

FIELD

Embodiments discussed herein relate, generally, to techniques for programmatically providing electronic data to consumers based on consumer device interactions.

BACKGROUND

Via electronic networks (e.g., the Internet), systems can provide promotions (e.g., for items, experiences, and/or services) associated with merchants to consumer devices. The efficient use of processing, networking, and storage capability may be improved by targeting promotions to consumers based on relevance. Applicant has identified a number of problems associated with conventional systems used to determine relevance of advertisements distributed over electronic networks. Solutions to these problems have been identified through applied effort, ingenuity, and innovation and such solutions are embodied by the inventive concepts described herein.

BRIEF SUMMARY

Various embodiments may provide for a system and/or apparatus configured to provide targeted promotions to networked consumer devices based on receiving and processing consumer interaction data received from the consumer devices. Advantageously, the techniques discussed herein provides for increased efficiency of network based communications through targeting of electronic data based on relevance. Similarly, electronic data that is less relevant or not relevant to the consumer is not sent via the network, thereby reducing system processing requirements and network congestion, and increasing throughput of relevant electronic data via the network. Selected promotions may be provided to consumer devices via subsequent impressions that also include user interfaces to facilitate the creation of further consumer interaction data via the consumer device inputs, thereby creating a feedback loop for programmatic machine learning and training of the relevance determination.

Some embodiments may provide for a system including one or more servers. The one or more servers may include communication circuitry and processing circuitry. The communication circuitry may be configured to connect with consumer devices via a network (e.g., the Internet). The processing circuitry may be configured to: provide impressions of a promotion to the consumer devices via the network, wherein: each of the impressions includes an electronic interface configured to facilitate creation of consumer interaction data via consumer device inputs; and the electronic interface provides for a plurality of consumer interaction types for the consumer device input, each consumer interaction type associated with a different interaction value. The processing circuitry may be further configured to: receive, via the network, consumer interaction data from the consumer device indicating consumer interaction with the impressions; determine an impression score for each of the one or more impressions based on the consumer interaction data, wherein the determination includes determining a first impression score for a first impression by: determining, based on the consumer interaction data, a consumer interaction type associated with the first impression; determining an interaction value associated with the consumer interaction type; and determining the first impression score of the first impression based on the interaction value. The processing circuitry may be further configured to: determine a promotion score of the promotion based on the impression score for each of the impressions; determine a selected promotion based on a comparison between the promotion score of the promotion and one or more other promotion scores associated with one or more other promotions; subsequent to determining the selected promotion, generate an impression of the selected promotion; and provide, via the network, the impression of the selected promotion to a consumer device.

In some embodiments, the processing circuitry configured to determine the interaction value associated with the consumer interaction type may include the processing circuitry being configured to: determine, based on the consumer interaction data, a funnel delay distribution indicating a relationship between consumer access times of impressions of promotions and consumer purchase times of the promotions; determine, based on the funnel delay distribution, a purchase delay threshold time; and determine the interaction value associated with the consumer interaction type based on the purchase delay threshold time.

In some embodiments, the processing circuitry configured to determine the promotion score of the promotion may include the processing circuitry being configured to: determine, based on the consumer interaction data, a funnel delay distribution indicating a relationship between consumer access times of impressions of promotions and consumer purchase times of the promotions; determine, based on the funnel delay distribution, a purchase delay threshold time; determine, based on the purchase delay threshold time, a purchase score indicating a probability that the promotion has been purchased via one or more impressions of the promotion provided to the consumer device; and determine the promotion score of the promotion based on the purchase score of promotion.

In some embodiments, the processing circuitry may be further configured to: determine a promotion category associated with the promotion; and determine the promotion score of the promotion based on consumer interaction data associated with one or more other promotions of the promotion category.

In some embodiments, the processing circuitry may be further configured to: determine a confidence score of the promotion score; determine an exploration score of the promotion based on the confidence score; and determine a second selected promotion based on a on comparison between the exploration score of the promotion and one or more other exploration scores associated with one or more other promotions.

In some embodiments, the plurality of consumer interaction types may include: a promotion purchase; and an initiation of promotion purchase without purchasing the promotion; and the processing circuitry configured to determine the first impression score may include the processing circuitry being configured to: determine whether a consumer account associated with the consumer device has purchased the promotion via a second impression of the one or more impressions; in response to determining that the consumer account has purchased the promotion via the second impression, determine the first impression score of the first impression as a first interaction value; determine whether the consumer account has initiated purchase of the promotion via the second impression without purchasing the promotion; and in response to determining that the consumer account has initiated purchase of the promotion via the second impression without purchasing the promotion, determine the first impression score of the first impression as a second interaction value, wherein the second interaction value indicates a lower level of consumer interest than the first interaction value.

In some embodiments, the plurality of consumer interaction types may include a promotion access without the initiation of promotion purchase; and the processing circuitry configured to determine the first impression score includes the processing circuitry being configured to: determine whether the promotion has been accessed via the second impression by the consumer account without initiating the purchase; and in response to determining that the promotion has been accessed via the second impression without initiating the purchase, determine the first impression score as a third interaction value, wherein the third interaction value indicates a lower level of consumer interest than the first interaction value and the second interaction value.

In some embodiments, the plurality of consumer interaction types may include an impression access without the promotion access; and the processing circuitry configured to determine the first impression score may include the processing circuitry being configured to: determine whether the second impression has been accessed by the consumer account without the promotion access; and in response to determining that the second impression has been accessed without the promotion access, determine whether the second impression has received a subsequent consumer interaction by the consumer account; and in response to determining that the second impression has failed to receive the subsequent consumer interaction, determine the impression score of the second impression as a fourth interaction value, wherein the fourth interaction value indicates a lower level of consumer interest than the first interaction value, the second interaction value, and the third interaction value.

In some embodiments, the processing circuitry configured to determine the first impression score may include the processing circuitry being configured to, in response to determining that the second impression has failed to be accessed, determine the impression score of the second impression as a fifth interaction value, wherein the fifth interaction value indicates a lower level of consumer interest than the first interaction value, the second interaction value, and the third interaction value and a higher level of consumer interest than the fourth interaction value.

In some embodiments, the initiation of the promotion purchase without purchasing the promotion may include selection of a buy button within a promotion display without a subsequent selection of a confirm purchase button; the promotion access without the initiation of promotion purchase may include selection of the promotion within an impression display without a subsequent selection of the buy button within the promotion display; and the impression access without the promotion access may include an access of the impression display without a selection of the promotion within the impression display.

Some embodiments may provide for a machine-implemented method. The method may include: providing, by circuitry of one or more servers connected with consumer devices via a network, impressions of a promotion to consumer devices, wherein: each of the impressions includes an electronic interface configured to facilitate creation of consumer interaction data via consumer device inputs; and the electronic interface provides for a plurality of consumer interaction types for the consumer device input, each consumer interaction type associated with a different interaction value. The method may further include: receiving, by the circuitry and via the network, consumer interaction data from the consumer devices indicating consumer interactions with the impressions; determining, by the circuitry, an impression score for each of the one or more impressions based on the consumer interaction data, wherein the determination includes determining a first impression score for a first impression by: determining, based on the consumer interaction data, a consumer interaction type associated with the first impression; determining an interaction value associated with the consumer interaction type; and determining the first impression score of the first impression based on the interaction value. The method may further include: determining, by the circuitry, a promotion score of the promotion based on the impression score for each of the impressions; and determining, by the circuitry, a selected promotion based on a comparison between the promotion score of the promotion and one or more other promotion scores associated with one or more other promotions; subsequent to determining the selected promotion, generating, by the circuitry, an impression of the selected promotion; and providing, by the circuitry and via the network, the impression of the selected promotion to a consumer device.

In some embodiments, determining the interaction value associated with the consumer interaction type may include: determining, based on the consumer interaction data, a funnel delay distribution indicating a relationship between consumer access times of impressions of promotions and consumer purchase times of the promotions; determining, based on the funnel delay distribution, a purchase delay threshold time; and determining the interaction value associated with the consumer interaction type based on the purchase delay threshold time.

In some embodiments, determining the promotion score of the promotion may include: determining, based on the consumer interaction data, a funnel delay distribution indicating a relationship between consumer access times of impressions of promotions and consumer purchase times of the promotions; determining, based on the funnel delay distribution, a purchase delay threshold time; determining, based on the purchase delay threshold time, a purchase score indicating a probability that the promotion has been purchased via one or more impressions of the promotion provided to the consumer device; and determining the promotion score of the promotion based on the purchase score of the promotion.

In some embodiments, the method may further include: determining a promotion category associated with the promotion; and determining the promotion score of the promotion based on consumer interaction data associated with one or more other promotions of the promotion category.

In some embodiments, the method may further include: determining a confidence score of the promotion score; determining an exploration score of the promotion based on the confidence score; and determining a second selected promotion based on a comparison between the exploration score of the promotion and one or more other exploration scores associated with one or more other promotions.

In some embodiments, the plurality of consumer interaction types may include: a promotion purchase; and an initiation of the promotion purchase without purchasing the promotion; and determining the first impression score may include: determining whether a consumer account associated with the consumer device has purchased the promotion via a second impression of the one or more impressions; in response to determining that the consumer account has purchased the promotion via the second impression, determining the first impression score of the first impression as a first interaction value; determining whether the consumer account has initiated purchase of the promotion via the second impression without purchasing the promotion; and in response to determining that the consumer account has initiated purchase of the promotion via the second impression without purchasing the promotion, determining the first impression score of the first impression as a second interaction value, wherein the second interaction value indicates a lower level of consumer interest than the first interaction value.

In some embodiments, the plurality of consumer interaction types may include a promotion access without the initiation of promotion purchase; and determining the first impression score may include: determining whether the promotion has been accessed via the second impression by the consumer account without initiating the purchase; and in response to determining that the promotion has been accessed via the second impression without initiating the purchase, determining the first impression score as a third interaction value, wherein the third interaction value indicates a lower level of consumer interest than the first interaction value and the second interaction value.

In some embodiments, the plurality of consumer interaction types may include an impression access without the promotion access; and determining the first impression score may include: determining whether the second impression has been accessed by the consumer account without the promotion access; and in response to determining that the second impression has been accessed without the promotion access, determining whether the second impression has received a subsequent consumer interaction by the consumer account; and in response to determining that the second impression has failed to receive the subsequent consumer interaction, determining the impression score of the second impression as a fourth interaction value, wherein the fourth interaction value indicates a lower level of consumer interest than the first interaction value, the second interaction value, and the third interaction value.

In some embodiments, determining the first impression score may include, in response to determining that the second impression has failed to be accessed, determining the impression score of the second impression as a fifth interaction value, wherein the fifth interaction value indicates a lower level of consumer interest than the first interaction value, the second interaction value, and the third interaction value and a higher level of consumer interest than the fourth interaction value.

In some embodiments, the initiation of the promotion purchase without purchasing the promotion may include selection of a buy button within a promotion display without a subsequent selection of a confirm purchase button; the promotion access without the initiation of promotion purchase may include selection of the promotion within an impression display without a subsequent selection of the buy button within the promotion display; and the impression access without the promotion access may include an access of the impression display without a selection of the promotion within the impression display.

Some embodiments may include circuitry and/or media configured to implement the methods and/or other functionality discussed herein. For example, one or more processors, and/or other machine components may be configured to implement the functionality discussed herein based on instructions and/or other data stored in memory and/or other non-transitory computer readable media.

These characteristics as well as additional features, functions, and details of various embodiments are described below. Similarly, corresponding and additional embodiments are also described below.

BRIEF DESCRIPTION OF THE DRAWINGS

Figure 1:
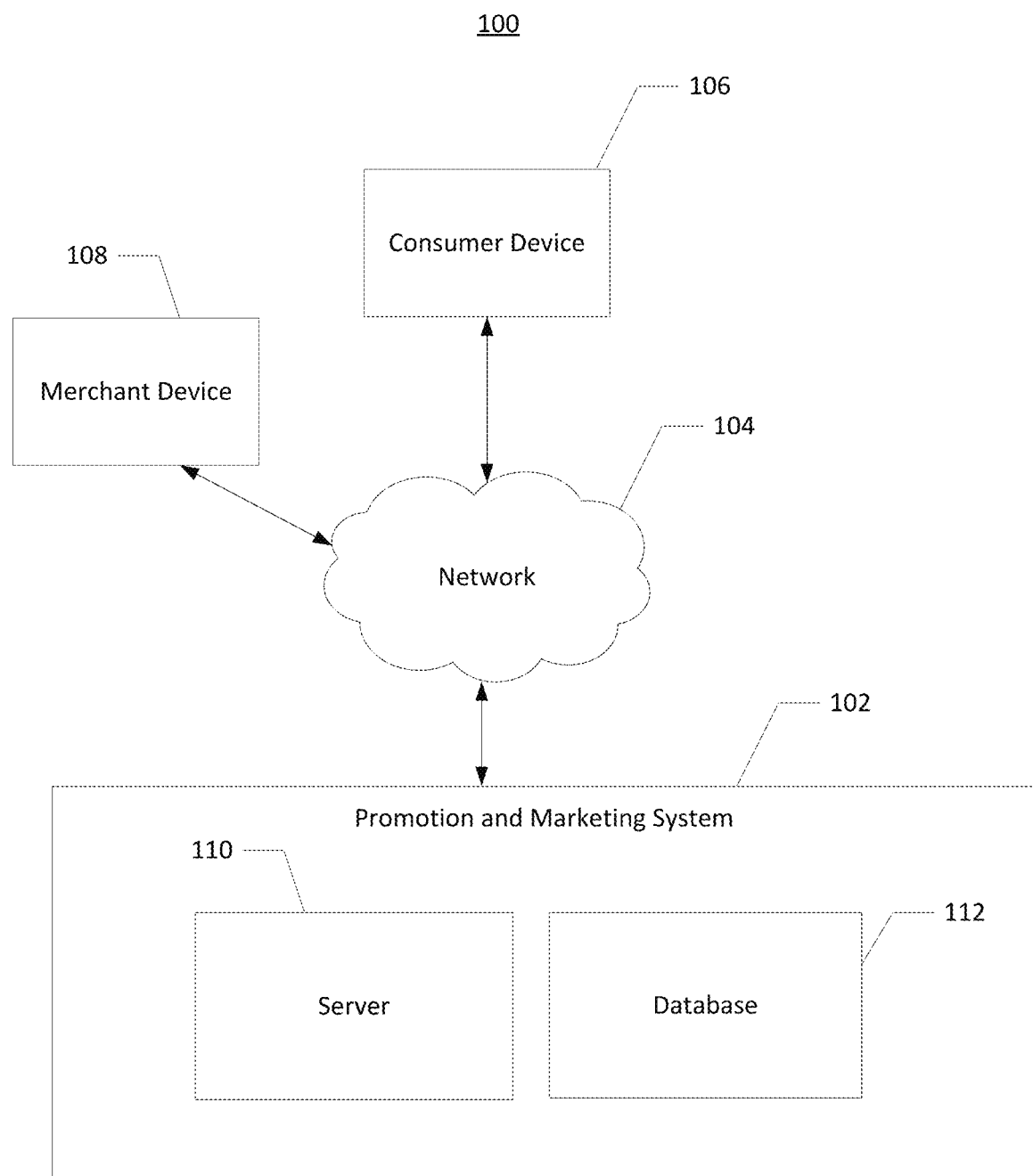
Figure 2:
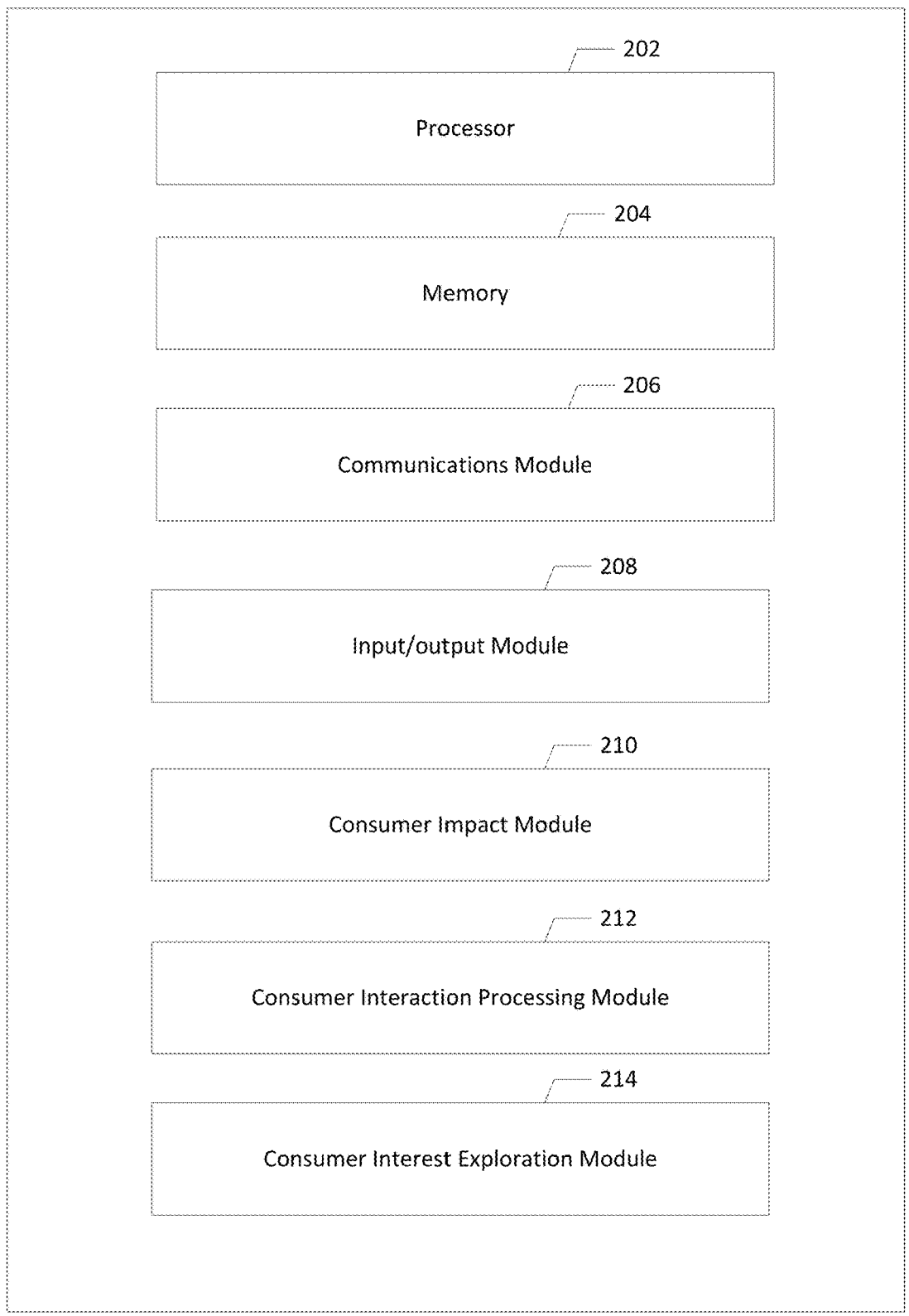
Figure 3:
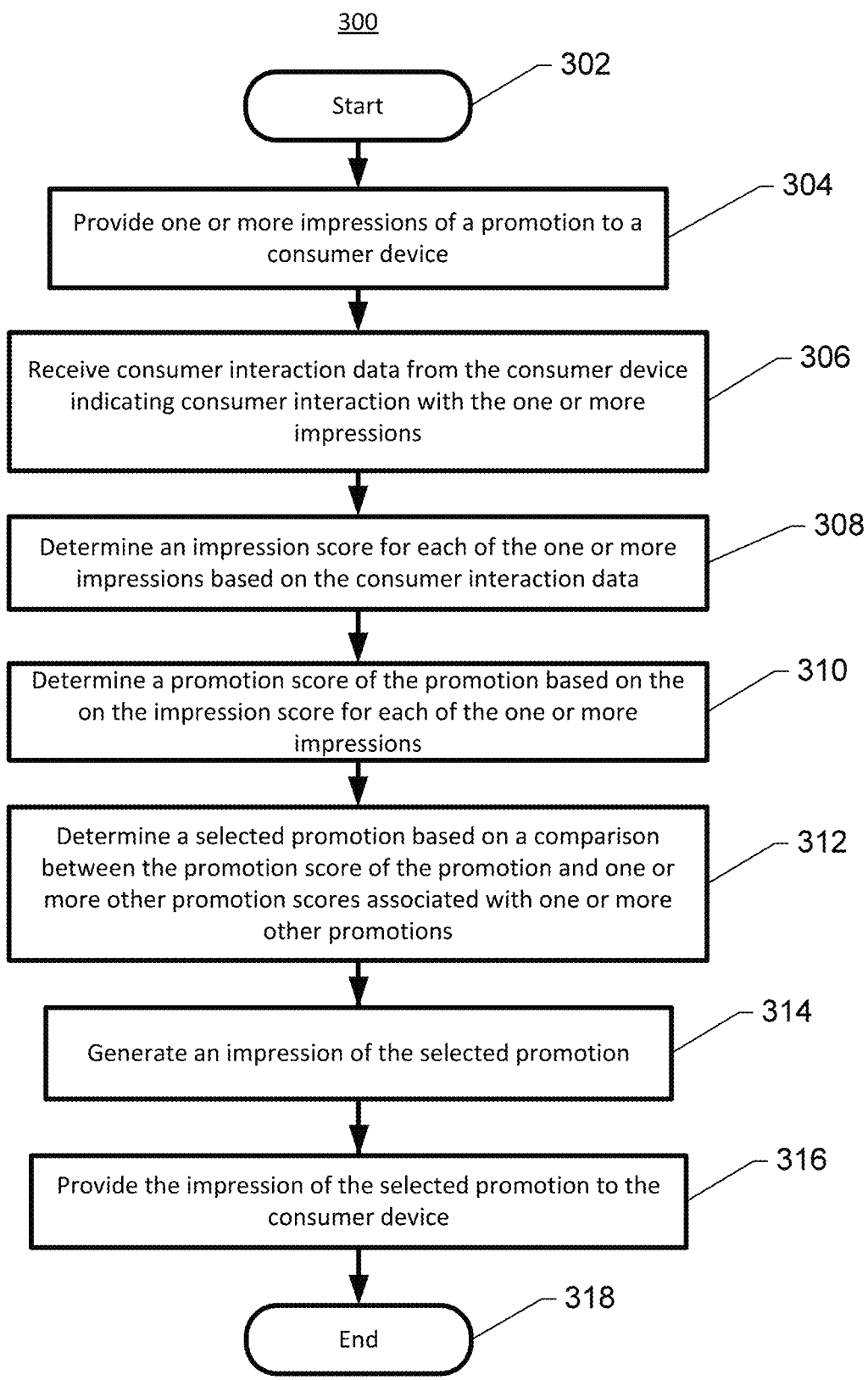
Figure 4:
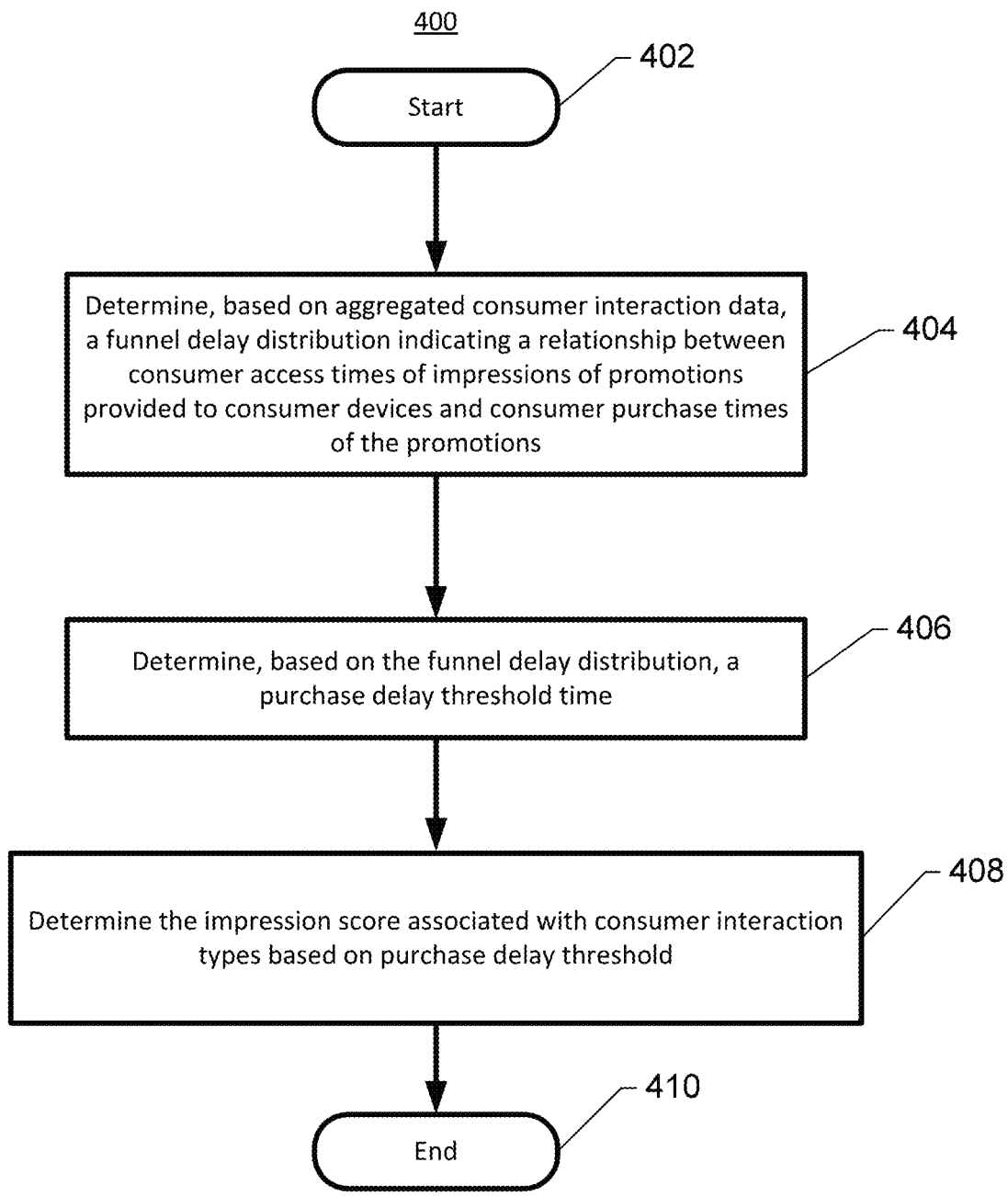
Figure 5:
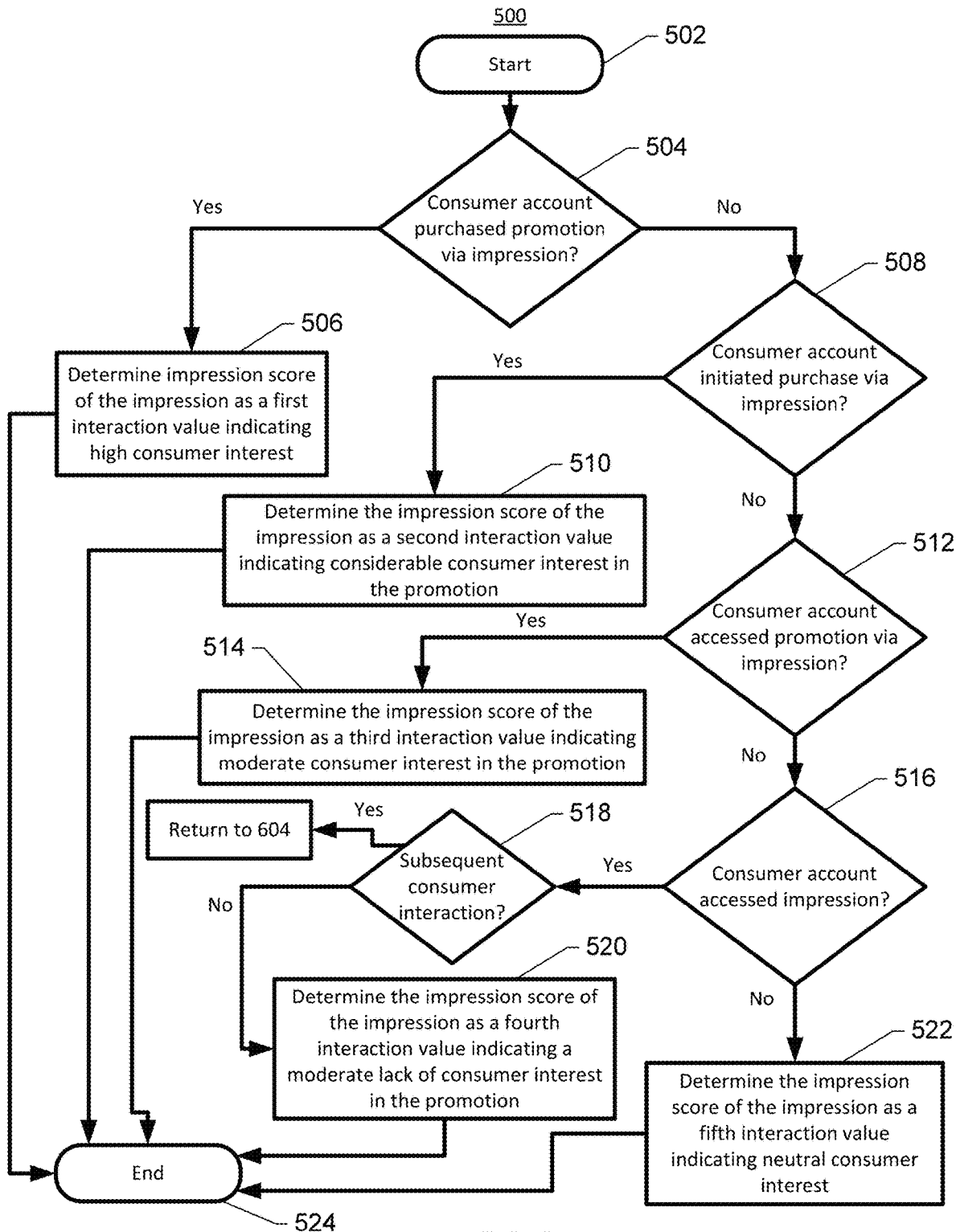
Figure 6:
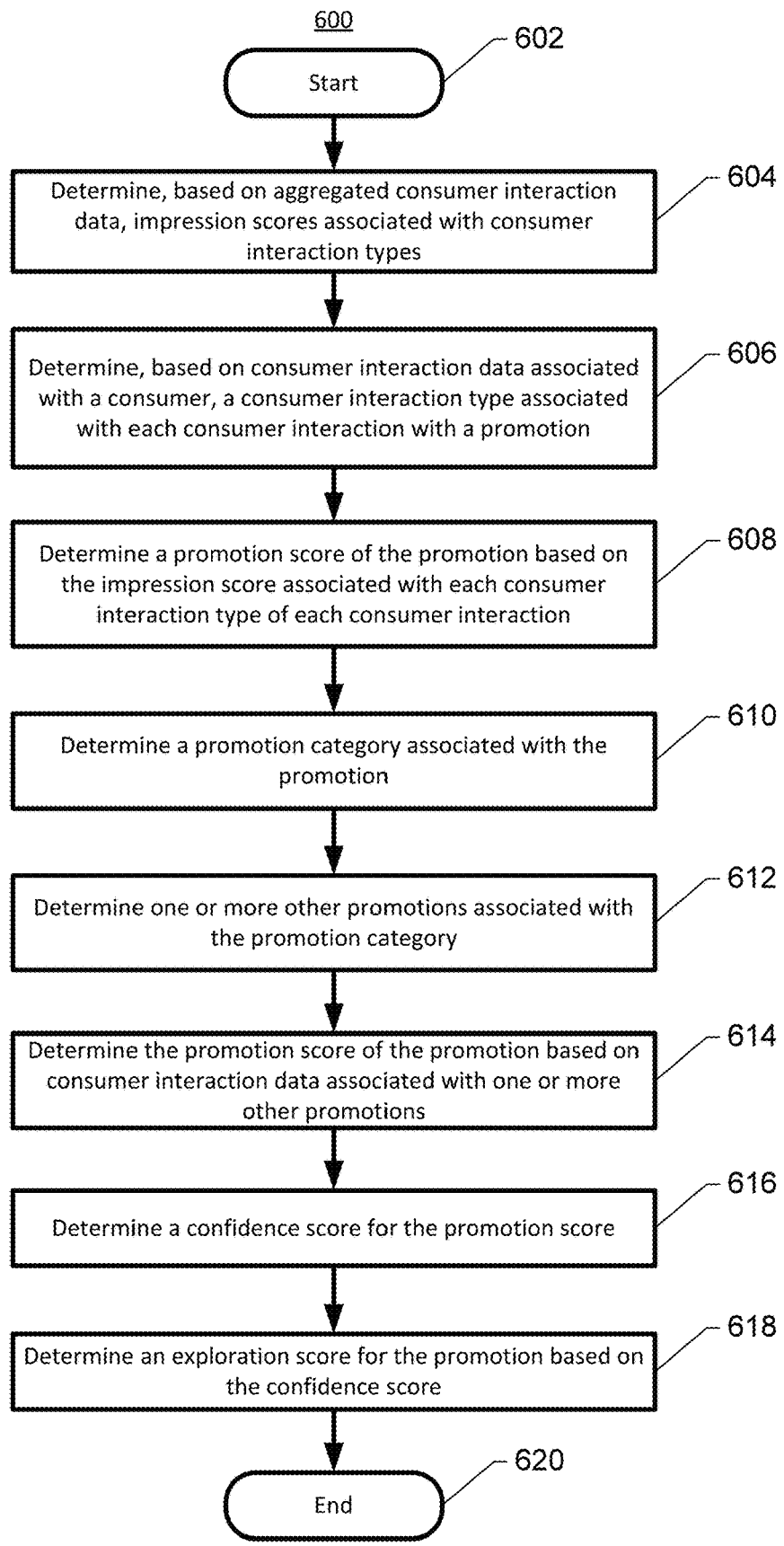
Figure 7:
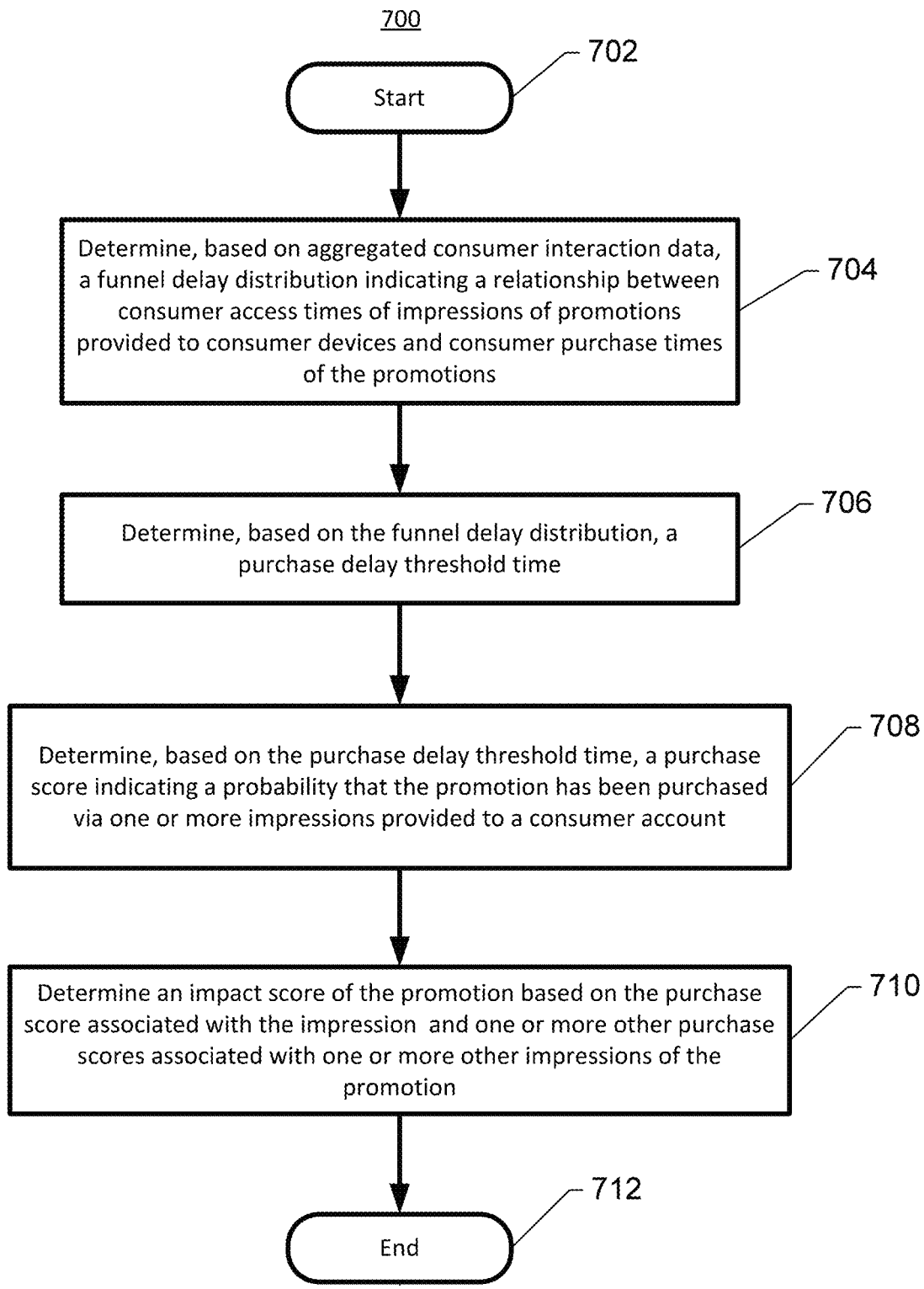
Figure 8:
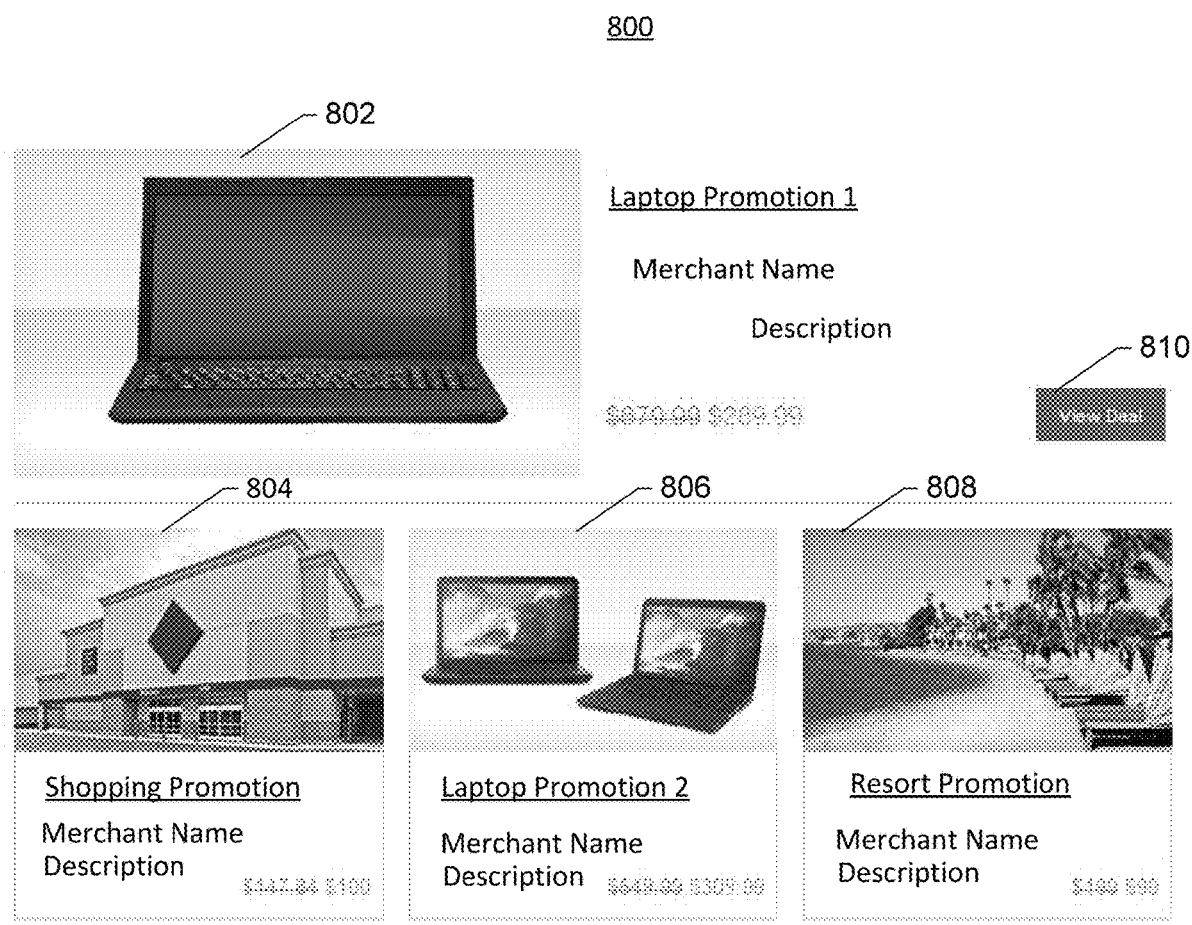
Figure 9:
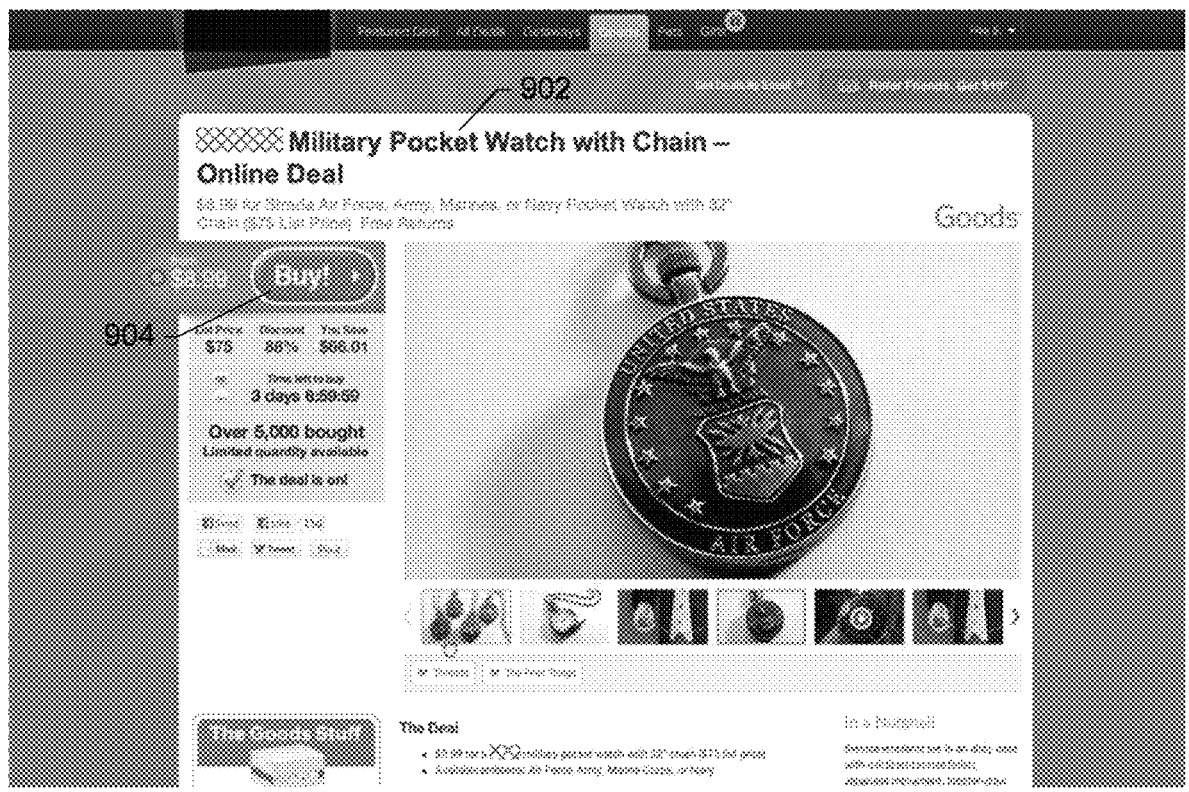

Having thus described some embodiments in general terms, reference will now be made to the accompanying drawings, which are not necessarily drawn to scale, and wherein:

FIG. 1 shows an example system in accordance with some embodiments;

FIG. 2 shows example circuitry in accordance with some embodiments;

FIG. 3 shows an example of a method for providing a promotion in accordance with some embodiments;

FIG. 4 shows an example of a method for determining an impression score of an impression, in accordance with some embodiments;

FIG. 5 shows an example of a method for determining a promotion score of a promotion as an interest score, in accordance with some embodiments;

FIG. 6 shows an example of a method for determining a promotion score as an interest score and exploration score, in accordance with some embodiments;

FIG. 7 shows an example of a method for determining a promotion score of a promotion as an impact score, in accordance with some embodiments;

FIG. 8 shows an example of an impression in accordance with some embodiments; and FIG. 9 shows an example promotion display in accordance with some embodiments.

DETAILED DESCRIPTION

Embodiments will be described more fully hereinafter with reference to the accompanying drawings, in which some, but not all embodiments contemplated herein are shown. Indeed, various embodiments may be implemented in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a device is described herein to receive data from another device, it will be appreciated that the data may be received directly from the another device or may be received indirectly via one or more intermediary devices, such as, for example, one or more servers, relays, routers, network access points, base stations, and/or the like, sometimes referred to herein as a "network." Similarly, where a device is described herein to send data to another device, it will be appreciated that the data may be sent directly to the another device or may be sent indirectly via one or more intermediary devices, such as, for example, one or more servers, relays, routers, network access points, base stations, and/or the like.

As used herein, the term "method" refers to one or more steps that may be performed by a device, apparatus, system, circuitry, one or more processors, or the like. Where an example method is shown as including more than one step, it will be appreciated that the steps may be performed in different orders than as shown in the example and that not all steps are necessarily required. Furthermore, the methods are described herein as being performed by example structures for clarity and are not limited to those structures (e.g., a particular server, device, apparatus, etc.) in some embodiments.

Brief Overview

Methods, systems, apparatus and computer program products described herein are operable for providing promotions to consumers based on consumer interactions. For example, the system may be configured to select a promotion for advertisement to a consumer from a plurality of available promotions based on a comparison of "promotion score." The promotion score of a promotion may be configured to indicate a programmatically determined expected effectiveness (e.g., probability of purchase, probability of purchase and redemption, etc.) of providing an impression to a consumer. For example, the promotion score may be determined as and/or based on an impact score, an interest score, an exploration score, and/or combinations thereof. The impact score may indicate (e.g., inversely) a programmatically determined likelihood that impressions of the promotion that have been provided to the consumer will generate a (e.g., future) purchase. The interest score may indicate a programmatically determined consumer interest in the promotion based on consumer interaction with impressions of the promotion that have been provided to the consumer. The exploration score may indicate the confidence of an impact and/or interest score (e.g., based on the volume and sampling reliability of available consumer interaction data). In various embodiments, one or more of the impact score, interest score and exploration score may be used to determine the promotion score of a promotion.

In some embodiments, server 110 may be configured to determine the promotion score (e.g., impact score and/or interest score) based on tracking consumer interaction data associated with impressions of promotions and processing the consumer interaction data. Repeated impressions of a promotion having high likelihood that one or more prior impressions of the promotion will generate a purchase (e.g., as indicated by the impact score) may be avoided such that the repeated impressions do not suffer diminishing returns. Impressions of promotions that are more tailored to consumer interests may be provided in lieu of promotions determined to be less interesting (e.g., as indicated by the interest score). Accordingly, server 110 may be configured to provide impressions including promotions that are more likely to result in a purchase and/or a redemption. In some embodiments, server 110 may be further configured to determine the promotion as an exploration score. The exploration score may be determined based on a confidence score of the interest score such that new promotions (e.g., unassociated with consumer interaction data) can be selected for the consumer.

A "promotion," as used herein, may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion.

In some embodiments, the system may be configured to provide impressions of promotions to consumer devices, such as for advertising or otherwise communicating the promotions. An "impression," as used herein, may include a communication, a display, or other perceived indication, such as a flyer, print media, e-mail, text message, application alert, mobile application notification, other type of electronic interface or distribution channel and/or the like, of one or more promotions.

In some embodiments (e.g., such as when the impression is provided via email, mobile application notification, webpage, etc.) the impression may include a user interface that allows the consumer to access (e.g., view, browse, etc.) the impression, access one or more promotions of the impression, initiate and complete a promotion purchase, among other things. The system may be configured to track relevant consumer interactions that serve as an indicator of consumer behavior, interest, and/or intent. As discussed in further detail herein, some embodiments may further provide techniques for determining, such as based on aggregated consumer interaction from multiple consumers, the proper weighted impact to apply to the various consumer interactions with impressions in determining promotion scores.

Exemplary System Architecture

FIG. 1 shows an example system 100 in accordance with some embodiments. System 100 may include promotion and marketing system 102 (or "system 102"), network 104, consumer device 106, and merchant device 108. System 102 may be communicably connected with consumer device 106 and merchant device 108 via network 104. System 102 may include server 110 and database 112.

Server 110 may include circuitry, networked processors, or the like configured to perform some or all of the server-based processes described herein and may be any suitable network server and/or other type of processing device. In some embodiments, system 102 may function as a "cloud" with respect to the consumer device 106 and/or merchant device 108. In that sense, server 110 may include several servers performing interconnected and/or distributed functions. To avoid unnecessarily overcomplicating the disclosure, server 110 is shown and described herein as a single server. In some embodiments, server 110 may be configured to generate promotions and impressions of promotions, provide impressions to consumer devices, receive consumer interaction data with impressions from consumer devices, and/or select promotions to send to consumers based on programmatic processing of the consumer interaction data, as described in greater detail below.

Database 112 may be any suitable network storage device configured to store some or all of the information described herein. For example, database 112 may be configured to store consumer information, merchant information, and/or promotion information. As such, database 112 may include, for example, one or more database systems, backend data servers, network databases, cloud storage devices, etc. To avoid unnecessarily overcomplicating the disclosure, database 112 is shown and described herein as a single database.

Network 104 may include one or more wired and/or wireless communication networks including, for example, a wired or wireless local area network (LAN), personal area network (PAN), metropolitan area network (MAN), wide area network (WAN), or the like, as well as any hardware, software and/or firmware for implementing the one or more networks (such as, e.g., network routers, switches, hubs, etc.). For example, network 104 may include a cellular telephone, mobile broadband, long term evolution (LTE), GSM/EDGE, UMTS/HSPA, IEEE 802.11, IEEE 802.16, IEEE 802.20, WiFi, dial-up, and/or WiMax network. Furthermore, network 104 may include a public network, such as the Internet, a private network, such as an intranet, or combinations thereof, and may utilize a variety of networking protocols now available or later developed including, but not limited to TCP/IP based networking protocols.

Consumer device 106 may be associated with a consumer and/or consumer account, such as a consumer with a consumer account provided by system 102. Although a single consumer device 106 is shown, system 100 may include any number of consumer devices that may be associated with various other consumers and/or consumer accounts. Consumer device 106 may be a mobile device and/or a stationary device. For example, consumer device 106 may be a mobile device such as a cellular telephone (including smartphones and/or other types of mobile telephones), laptop, tablet, electronic reader, e-book device, media device, and/or the like. Additionally and/or alternatively, consumer device 106 may be a stationary device such as a desktop computer, work station, or the like.

Merchant device 108 may be associated with a merchant and/or provider of promotions. Although a single merchant device 108 is shown, system 100 may include any number of merchant devices that may be associated with various other merchants. In some embodiments, merchant device 108 may be configured to provide point-of-sale (POS) functionality for the merchant, such as at the merchant's shop. Furthermore, merchant device 108 may be a stationary and/or mobile device. In some embodiments, merchant device 108 may be configured to provide promotion data to system 102. The promotion data may indicate a promotion for one or more goods, experiences and/or services and/or one or more parameters of the promotion (e.g., target audience, timing, purchase value, promotional value, residual value, etc.). System 102 may then generate and/or provide one or more impressions for the promotion to consumer device 102.

FIG. 2 shows a schematic block diagram of example circuitry 200, some or all of which may be included in system 102, server 110, database 112, user device 106, and merchant device 108. In accordance with some example embodiments, circuitry 200 may include various means, such as one or more processors 202, memories 204, communications modules 206, and/or input/output modules 208.

In some embodiments, such as when circuitry 200 is included in system 102 and/or merchant device 108, consumer impact module 210, consumer interaction processing module 212, and/or consumer interest exploration module 214 may also or instead be included. As referred to herein, "module" includes hardware, software and/or firmware configured to perform one or more particular functions. In this regard, the means of circuitry 200 as described herein may be embodied as, for example, circuitry, hardware elements (e.g., a suitably programmed processor, combinational logic circuit, integrated circuit, and/or the like), a computer program product comprising computer-readable program instructions stored on a non-transitory computer-readable medium (e.g., memory 204) that is executable by a suitably configured processing device (e.g., processor 202), or some combination thereof.

Processor 202 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments, processor 202 may comprise a plurality of processing means. The plurality of processing means may be embodied on a single computing device or may be distributed across a plurality of computing devices collectively configured to function as circuitry 200. The plurality of processing means may be in operative communication with each other and may be collectively configured to perform one or more functionalities of circuitry 200 as described herein. In an example embodiment, processor 202 may be configured to execute instructions stored in memory 204 or otherwise accessible to processor 202. These instructions, when executed by processor 202, may cause circuitry 200 to perform one or more of the functionalities described herein.

Whether configured by hardware, firmware/software methods, or by a combination thereof, processor 202 may comprise an entity capable of performing operations according to embodiments of the present invention while configured accordingly. Thus, for example, when processor 202 is embodied as an ASIC, FPGA or the like, processor 202 may comprise specifically configured hardware for conducting one or more operations described herein. As another example, when processor 202 may be embodied as an executor of instructions, such as may be stored in memory 204, the instructions may specifically configure processor 202 to perform one or more algorithms, methods or operations described herein. For example, processor 202 may be configured to execute operating system applications, firmware applications, media playback applications, media editing applications, among other things.

Memory 204 may comprise, for example, volatile memory, non-volatile memory, or some combination thereof. Although illustrated in FIG. 2 as a single memory, memory 204 may comprise a plurality of memory components. The plurality of memory components may be embodied on a single computing component or distributed across a plurality of computing components. In various embodiments, memory 204 may comprise, for example, a hard disk, random access memory, cache memory, flash memory, a compact disc read only memory (CD-ROM), solid state memory, digital versatile disc read only memory (DVD-ROM), an optical disc, circuitry configured to store information, integrated circuitry, chemical/biological memory, paper, or some combination thereof. Memory 204 may be configured to store information, data, applications, instructions, or the like for enabling circuitry 200 to carry out various functions in accordance with example embodiments discussed herein. For example, in at least some embodiments, memory 204 may be configured to buffer input data for processing by processor 202. Additionally or alternatively, in at least some embodiments, memory 204 may be configured to store program instructions for execution by processor 202 and/or data for processing by processor 202. Memory 204 may store information in the form of static and/or dynamic information. This stored information may be stored and/or used by circuitry 200 during the course of performing its functionalities.

Communications module 206 may be embodied as any component or means embodied in circuitry, hardware, a computer program product comprising computer readable program instructions stored on a computer readable medium (e.g., memory 204) and executed by a processing device (e.g., processor 202), or a combination thereof that is configured to receive and/or transmit data from/to another device, such as, for example, a second circuitry 200 and/or the like. In some embodiments, communications module 206 (like other components discussed herein) can be at least partially embodied as or otherwise controlled by processor 202. In this regard, communications module 206 may be in communication with processor 202, such as via a bus. Communications module 206 may include, for example, an antenna, a transmitter, a receiver, a transceiver, network interface card and/or supporting hardware and/or firmware/software for enabling communications. Communications module 206 may be configured to receive and/or transmit any data that may be stored by memory 204 using any protocol that may be used for communications. Communications module 206 may additionally and/or alternatively be in communication with the memory 204, input/output module 208 and/or any other component of circuitry 200, such as via a bus. Communications module 206 may be configured to use one or more communications protocols such as, for example, short messaging service (SMS), Wi-Fi (e.g., a 802.11 protocol, Bluetooth, etc.), radio frequency systems (e.g., 900 MHz, 1.4 GHz, and 5.6 GHz communication systems), infrared, GSM, GSM plus EDGE, CDMA, quad-band, and other cellular protocols, VOIP, or any other suitable protocol Input/output module 208 may be in communication with processor 202 to receive an indication of an input and/or to provide an audible, visual, mechanical, or other output. In that sense, input/output module 208 may include means for performing analog-to-digital and/or digital-to-analog data conversions. Input/output module 208 may include support, for example, for a display, touch screen, keyboard, button, click wheel, mouse, joystick, an image capturing device, microphone, speaker, biometric scanner, and/or other input/output mechanisms. In embodiments where circuitry 200 may be implemented as a server or database, aspects of input/output module 208 may be reduced as compared to embodiments where circuitry 200 may be implemented as an end-user machine or other type of device designed for complex user interactions. In some embodiments (like other components discussed herein), input/output module 208 may even be eliminated from circuitry 200. Alternatively, such as in embodiments wherein circuitry 200 is embodied as a server or database, at least some aspects of input/output module 208 may be embodied on an apparatus used by a user that is in communication with circuitry 200. Input/output module 208 may be in communication with memory 204, communications module 206, and/or any other component(s), such as via a bus. Although more than one input/output module and/or other component can be included in circuitry 200, only one is shown in FIG. 2 to avoid overcomplicating the disclosure (e.g., like the other components discussed herein).

In some embodiments, consumer impact module 210, consumer interaction processing module 212, and/or consumer interest exploration module 214 may also or instead be included and configured to perform the functionality discussed herein related to determining promotion scores (e.g., impact score, interest score, and exploration score, respectively). In some embodiments, some or all of the functionality of consumer impact module 210, consumer interaction processing module 212, and/or consumer interest exploration module 214 may be performed by processor 202. In this regard, the example processes and algorithms discussed herein can be performed by at least one of processor 202, consumer impact module 210, consumer interaction processing module 212, and/or consumer interest exploration module 214. For example, non-transitory computer readable storage media can be configured to store firmware, one or more application programs, and/or other software, which include instructions and other computer-readable program code portions that can be executed to control processors of the components of system 200 to implement various operations, including the examples shown herein. As such, a series of computer-readable program code portions may be embodied in one or more computer program products and can be used, with a device, server, database, and/or other programmable apparatus, to produce the machine-implemented processes discussed herein.

Any such computer program instructions and/or other type of code may be loaded onto a computer, processor or other programmable apparatus's circuitry to produce a machine, such that the computer, processor other programmable circuitry that executes the code may be the means for implementing various functions, including those described herein. In some embodiments, one or more external systems (such as a remote cloud computing and/or data storage system) may also be leveraged to provide at least some of the functionality discussed herein.

As described above and as will be appreciated based on this disclosure, various embodiments may be implemented as methods, mediums, devices, servers, databases, systems, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD/DVD-ROMs, flash memory, optical storage devices, quantum storage devices, chemical storage devices, biological storage devices, magnetic storage devices, etc.

Embodiments have been described above with reference to block diagrams of components, such as functional modules, system components and circuitry. Below is a discussion of an example process flowcharts describing functionality that may be implemented by one or more components discussed above. Each block of the block diagrams and process flowcharts, and combinations of blocks diagrams and process flowcharts, respectively, can be implemented by various means including computer program instructions. These computer program instructions may be loaded onto a general purpose computer, special purpose computer, or other programmable data processing apparatus, such as processor 202, to produce a machine, such that the computer program product includes the instructions which execute on the computer or other programmable data processing apparatus to create a means for implementing the functions specified in the flowchart block or block diagrams.

These computer program instructions may also be stored in a computer-readable storage device (e.g., memory 204) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the block diagrams and process flowcharts, and combinations of blocks in the block diagrams and process flowcharts, can be implemented by special purpose hardware-based computer systems that perform the specified functions or steps, or combinations of special purpose hardware and computer instructions.

Providing Promotions Based on Consumer Interactions

FIG. 3 shows an example of a method for providing a promotion in accordance with some embodiments. Method 300 may be performed to provide promotions to consumers that are selected based on promotion score. Method 300 is described as being performed by system 102 (e.g., server 110), however, any suitable structures (e.g., one or more servers, a networked device, hardware, software, firmware, circuitry, merchant device 108, promotion module 210, etc.) may also be used in various embodiments.

Method 300 may start at 302 and proceed to 304, where server 110 may be configured to provide one or more impressions of a promotion to a consumer device. In some embodiments, the consumer device may be associated with a consumer account of a consumer. The one or more impressions may be provided at different times and may be provided programmatically (e.g., at scheduled times) and/or in response to receiving a request from the consumer device (e.g., to access a webpage including impressions). The one or more impressions of the promotion may be provided via any suitable communication channels. As discussed above, some example communication channels may include email, mobile application, webpage and/or web application, among other things. Server 110 may be further configured to track the one or more impressions that were sent the consumer account.

FIG. 8 shows an example of an impression 800, in accordance with some embodiments. Impression 800 is an example of an impression that may be provided via a communication channel capable of consumer interaction. For example, impression 800 may be provided as an email, mobile application, webpage and/or web application, etc. Impression 800 may include an indication of one or more, such as promotions 802, 804, 806 and 808. In that sense, an impression may include an indication of one or more promotions. Similarly, a (e.g., repeated) promotion may be provided to a consumer more than a single time, such as via multiple impressions.

Returning to FIG. 3, at 306, server 110 may be configured to receive consumer interaction data from the consumer device indicating consumer interaction with the one or more impressions. In some embodiments, consumer interaction data may include data generated by server 110 based on a failure to receive consumer interaction data (e.g., within a predetermined time and/or up to the current time). The consumer interaction data may indicate, for example, that the consumer has opened an impression, "moused-over" an impression, accessed a promotion via the impression, initiated a purchase, completed a purchase, among other things. Server 110 may be configured to receive consumer interaction data relevant to the monitoring of any consumer interaction of interest and/or likelihood of purchase.

At 308, server 110 may be configured to determine an impression score for each of the one or more impressions of the promotion based on the consumer interaction data. The impression score of an impression may indicate the contribution of the impression and/or consumer interaction with the impression on the desirability of providing a subsequent impression of the promotion to the consumer. In some embodiments, such as when promotions are selected based on exploration score and as discussed in further detail below with respect to methods 400-600, the impression score of an impression may be configured to indicate the influence of consumer interaction type on the desirability of the promotion to the consumer. In that sense, the impression score associated with to an impression may vary based on the nature of the consumer interaction with the impression or "consumer interaction type." The impression score may be determined, at least in part, based on the consumer interaction indicated type by the consumer interaction data.

Alternatively or additionally, such as when promotions are selected based on impact score, the impression score of an impression may be configured to indicate (e.g., inversely) the influence of the impression on the likelihood that the consumer will purchase the promotion. As discussed in further detail below with respect to method 500 and FIG. 5, the likelihood of the impression generating a purchase of the promotion is referred to as a purchase score, which may be inversely related to the impression score and determined based on aggregated consumer interaction data.

In some embodiments, server 110 may be configured to only determine impression scores for impressions that have been provided to the consumer account within a predetermined time, via particular communication channels, among other things. In some embodiments, server 110 may be configured to consider each impression of the promotion that has been provided to the consumer.

At 310, server 110 may be configured to determine a promotion score of the promotion based on the impression score for each of the one or more impressions of the promotion. The promotion score may be determined based on an algorithmic transformation of each impression score of the promotion. For example, in some embodiments, the promotion score may be determined as an average of each applicable impression score.

As discussed above, the promotion score may include one or more of an impact score, an interest score, and exploration score. For example, in some embodiments, the promotion score may be determined as one of the impact score, interest score, and exploration score. In another example, the promotion score may be determined as an average of two of more of the impact score, interest score, and exploration score. In a third example, two or more of the impact score, interest score, and exploration score may be used to select (e.g., multiple) impressions.

At 312, server 110 may be configured to determine a selected promotion based on a comparison between the promotion score of the promotion and one or more other promotions scores associated with one or more other promotions. For example, available promotions may be stored as promotion data (e.g., in database 112) and accessed to determine the selected promotion. In response to determining to provide an impression of a promotion, server 110 may be configured to perform 304-310 for each available promotion under consideration. Based on the promotion score of each available promotion, server 110 may be configured to determine the selected promotion. For example, the selected promotion may be determined based on the highest promotion score.

In some embodiments, server 110 may be configured to select a plurality of selected promotions. For example, different promotions may be selected based on impact score, interest score, and/or exploration score. In another example, a plurality of promotions may be selected, such as, based on ranking the available promotions based on promotion score.

At 314, server 110 may be configured to generate an impression of the selected promotion. For example, the selected promotion may be included within an impression as shown for promotions 802-808 within impression 800 shown in FIG. 8. In some embodiments, the impression may include a plurality of promotions. Each promotion may be determined based on promotion score, such as one or more of impact score, interest score, and/or exploration score.

At 316, server 110 may be configured to provide the impression of the selected promotion to the consumer device. For example, server 110 may be configured to provide the impression to the consumer device via network 104, such as programmatically and/or in response to a request from the consumer device. In some embodiments, method 300 may be repeated based on the provided impression at 316. For example, server 110 may receive consumer response data based on the impression and may be configured to determine promotion scores based on the consumer response data. Method 300 may then end at 318.

FIG. 4 shows an example of a method 400 for determining an impression score of an impression for an interest score, in accordance with some embodiments. In some embodiments, method 400 may be prior to method 300 to determine associations between consumer interaction types and impression scores. For example, server 110 may be configured to track and aggregate consumer interaction data (e.g., across consumers) to determine impression scores (e.g., their values) associated with various consumer interaction types.

In some embodiments, consumer interaction types may be defined for categories of consumer interactions across (e.g., all) promotions and impressions and may be each associated with different impression scores. The consumer interaction types may be defined based on characteristics of the consumer interaction and/or characteristics of the impression provided to the consumer device. For example, impressions provided via different communication channels (email, mobile application, webpage/application, text message, etc.) may be associated with different consumer interaction types.

In some embodiments, consumer interaction types may additionally or alternatively be defined based on the characteristics of the consumer interaction (e.g., in alternative or in addition to categorization based on channel). For example, accessing an impression, accessing a promotion via an impression (e.g., selecting a promotion 802-808 within impression 800 shown in FIG. 8), initiating a purchase via an impression (e.g., selecting buy button 904 within promotion display 900), and/or purchasing a promotion via the impression (e.g., completing a purchase subsequent to selecting buy button 904) may each be associated with different consumer interaction types, as discussed in greater detail below in connection with method 600 and FIG. 6.

In some embodiments, consumer interaction type may additionally or alternatively be defined based on the characteristics of the impression. A promotion may be provided within a portion of an impression that includes one or more other promotions. With reference to impression 800, for example, promotion 802 may be in position 1, while positions 804-808 may be in positions 2-4, respectively. Because promotion 802 is featured more prominently within impression 800, the effect of promotion 802 being within impression 800 may be higher than promotions 804-808. Other examples may include, for example, the subject line promotion of an email impression including multiple other promotions being of a different type than a promotion that is featured only in the email body.

In general, impressions and/or consumer interactions that indicate the same or a similar influence in the likelihood of producing a promotion (e.g., independent of promotional content) may be grouped into a consumer interaction type. For example, a consumer interaction indicating access to promotion 802 in position 1 (e.g., the uppermost, "top", or most valuable portion of the impression), being in a more prominent position within impression 800 than promotions 804-808, may indicate a different influence on the likelihood of purchase than a consumer interaction indicating access to promotion 804. In other words, because impression 800 may be more effective for promotion 802 than promotions 804-808, the consumer impact of each of the promotions of impression 800 may be different. Accordingly, consumer interactions with promotion 802 may be associated with similar consumer interactions with promotions in other impressions within position 1. For example, a consumer interaction type can be defined as a promotion in position 1 being accessed. Another consumer interaction type can be defined as a promotion in position 2 being accessed, and so forth for other consumer interactions (e.g., access, purchase, initiation of purchase, etc.).

Table 1 shows an example set of consumer interaction type definitions. Here, consumer interaction types are differentiated based on communication channel, position of the promotion within the impression (e.g., subject line, position 1, position 2-3, etc.), and consumer interaction (e.g., access, initiate purchase, etc.). An impression via each communication channel includes positions for up to 16 or more promotions (e.g., located within positions 1-16). In some embodiments, two or more promotion positions may be aggregated into buckets (e.g., position 2-3 of email impressions) for the analysis. For example, promotions 804-808 of impression 800 may be placed in the same position bucket because they are in the same row of impression 800.

TABLE 1

| Communication Channel | Consumer Interaction Type |
| --- | --- |
| Email | Subject Line Impression |
|  | Position 1 access |
|  | Position 2-3 access |
|  | Position 4-7 access |
|  | Position 8-15 access |
|  | Position 16+ access |
|  | Position 1 initiate purchase |
|  | Position 2-3 initiate purchase |

TABLE 1-continued

| Communication Channel | Consumer Interaction Type |
|---|---|
| | Position 4-7 initiate purchase |
| | Position 8-15 initiate purchase |
| | Position 16+ initiate purchase |
| Mobile | Position 1 access |
| | Position 2-3 access |
| | Position 4-7 access |
| | Position 8-15 access |
| | Position 16+ access |
| | Position 1 initiate purchase |
| | Position 2-3 initiate purchase |
| | Position 4-7 initiate purchase |
| | Position 8-15 initiate purchase |
| | Position 16+ initiate purchase |
| Webpage/application | Position 1 access |
| | Position 2-3 access |
| | Position 4-7 access |
| | Position 8-15 access |
| | Position 16+ access |
| | Position 1 initiate purchase |
| | Position 2-3 initiate purchase |
| | Position 4-7 initiate purchase |
| | Position 8-15 initiate purchase |
| | Position 16+ initiate purchase |
| General | Buy Button Click |
| | Purchase |
| | Redemption |

Method 400 may begin at 402 and proceed to 404, server 110 may be configured to determine, based on aggregated consumer interaction data, a funnel delay distribution indicating a relationship between consumer access times of impressions of promotions provided to consumer devices and consumer purchase times of the promotions. The aggregated consumer interaction data, for example, may include consumer interaction data associated with other consumers. In some embodiments, server 110 may be configured to receive (e.g., at 306 of method 300) consumer access data associated with multiple consumers. Some or all of the consumer access data may be aggregated (e.g., considered as a set) and/or otherwise stored in database 112.

The consumer access time of an impression may indicate the time (e.g., a time stamp) when a consumer first accesses the impression. For an email impression, for example, the consumer access time may indicate the time in which the email was sent by server 110 and/or received by consumer device 108. The consumer purchase time of a promotion may indicate the time (e.g., a time stamp) when a consumer purchases the promotion. The funnel delay distribution may indicate the distribution (e.g., for all consumers) of the difference in time between the impression access time and promotion purchase time. In some embodiments, the difference in time may represent the length of time followed by users that access an impression, review the promotion(s), initiate a purchase, and complete the purchase.

At 406, server 110 may be configured to determine, based on the funnel delay distribution, a purchase delay threshold time. The purchase delay threshold time may define a period within which a predetermined percentage of purchases are completed within the funnel delay distribution. For example, if the predetermined percentage is set to 95%, the purchase delay threshold time may define the period within which 95% of purchases of a promotion via an impression are completed subsequent to consumer access.

At 408, server 110 may be configured to determine the impression score associated with the consumer interaction type based on the purchase delay threshold time. For example, each impression across the promotions sent to consumers may be considered. For each impression, server 110 may be configured to determine whether the time since being sent for the impression fails to exceed the purchase delay threshold (e.g., indicating that it is likely that the impression will result in a purchase in the future). The impression time since being sent of an impression may be defined as a difference between the current time (e.g., the server and/or system time) and the time when the impression was sent to a consumer. If the impression time since being sent fails to exceed the purchase delay threshold, server 110 may be configured to generate an equation $IS_1+IS_2 \ldots +IS_n=1$, where $IS_t$ is the impression score associated with each consumer interaction type $t=1-n$ having impression time since being sent that fails to exceed the purchase delay threshold. If the impression time since being sent exceeds the purchase delay threshold, server 110 may be configured to generate an equation $IS_1+IS_2 \ldots +IS_n=-1$, where $IS_t$ is the impression score associated with each consumer interaction type $t=1-n$ having impression time since being sent that exceeds the purchase delay threshold. Server 110 may be further configured to apply a linear regression algorithm over all generated equations (e.g., across all promotions and their impressions) such that the values of all $IS_t$ for each consumer interaction type converges to optimal solutions.

In some embodiments, the optimal solutions and/or impression scores may be stored in database 112 and accessed by server 110 to determine impression scores for a promotion under consideration (e.g., at 308 of method 300).

In some embodiments, impression scores may be determined to account for potential dependencies of consumer interaction types. For example, server 110 may be configured to generate for each set of impressions seen in the past for a given consumer and promotion an equation: $a*IS_1 + b*IS_2 \ldots +n*IS_n = +/-1$, where $IS_1 - IS_n$ are impression scores associated with different consumer interaction types $1-n$ as described above. Server 110 may be further configured to perform a regression analysis over the all generated equations to determine the values of $IS_t$ and/or values of the a-n weighting coefficients. Method 400 may then proceed to 410 and end.

FIG. 5 shows an example of a method 500 for determining a promotion score of a promotion as an interest score, in accordance with some embodiments. The interest score may indicate a programmatically determined consumer interest in the promotion based on consumer interaction with one or more impressions of the promotion that have been provided to the consumer. As discussed above, different consumer interaction types may be associated with different impression scores and the characteristics of a consumer interaction may be associated with different consumer interaction types. In some embodiments, method 600 may be performed at 308 of method 300 to determine an impression score for each of the one or more impressions of a promotion that has been provided to the consumer device of a consumer.

Method 500 may begin at 502 and proceed to 504, where server 110 may be configured to determine (e.g., for each of the one or more impressions sent to the consumer and/or associated with received consumer interaction data at 304 and 306 of method 300), whether the consumer account associated with the consumer device has purchased the promotion via the impression. FIG. 9 shows an example promotion display 900, in accordance with some embodiments. Promotion display 900 may be an example of a user interface that may be provided to the consumer device, such as in response to the consumer selecting a promotion 802-808 in impression 800. Promotion display 900 may include promotion data 902 (e.g., promotion name, price, image, video, details, etc.) and buy button 904.

In some embodiments, in response to the consumer selecting buy button 904, server 110 may be configured to provide a confirmation display. The confirmation display may be configured to receive and/or otherwise determine (e.g., via stored consumer data) consumer payment information. The confirmation display may further include a confirm purchase button. Server 110 may be configured to determine the consumer account has purchased the promotion via impression 800 based on the consumer selecting the confirm purchase button.

In response to determining that the consumer account has purchased the promotion via the impression, method 500 may proceed to 506, where server 110 may be configured to determine an impression score of the impression as a first interaction value indicating high consumer interest. For example, server 110 may be configured to determine the first interaction value based on the consumer interaction type being the purchase of the promotion. In some embodiments, the first interaction value (as well as the other interaction values of impression scores discussed herein) may be determined as discussed above in connection with method 400.

Returning to 504, in response to determining the consumer account has not purchased the promotion via the impression, method 500 may proceed to 508, where server 110 may be configured to determine whether the consumer account initiated purchase of the promotion via the impression. For example, server 110 may be configured to determine that the consumer account initiated the purchase of promotion based on the consumer selecting buy button 904 in promotion display 900. Server 110 may be further configured to determine that the consumer has initiated purchase without purchasing the promotion based on selection of buy button 904 within a promotion display 900 without a subsequent selection of a confirm purchase button (e.g., within the confirmation display).

In response to determining that the consumer account initiated purchase of the promotion via the impression, method 500 may proceed to 510, where server 110 may be configured to determine the impression score of the impression as a second interaction value indicating considerable consumer interest in the promotion. For example, server 110 may be configured to determine the second interaction value based on the consumer interaction type being the initiation of purchase and failure to purchase the promotion. The first interaction value may be configured to indicate a higher consumer interest than the second interaction value.

Returning to 508, in response to determining that the consumer account has failed to initiate purchase via the impression, method 500 may proceed to 512, where server 110 may be configured to determine whether the consumer account accessed the promotion via the impression. For example and with reference to FIG. 8, server 110 may be configured to determine that the consumer account accessed promotion 802 based on the consumer selecting promotion 802 within impression 800, such as via view deal button 810. Server 110 may be further configured to determine that the promotion was access without the initiation of promotion purchase based on the consumer selecting a promotion 802-808 within impression display 800 without a subsequent selection of the buy button 904 within the promotion display 900.

In response to determining that the consumer account has accessed the promotion via the impression, method 500 may proceed to 514, where server 110 may be configured to determine the impression score of the impression as a third interaction value indicating moderate consumer interest in the promotion. For example, server 110 may be configured to determine the third interaction value based on the consumer interaction type being access of the promotion via the impression without an initiation of purchase. The third interaction value may be configured to indicate a lower consumer interest than the first and second interaction values.

Returning to 512, in response to determining that the consumer account has failed to access the promotion via the impression, method 500 may proceed to 516, where server 110 may be configured to determine whether the consumer account has accessed the promotion. For example, impression 800 may be determined to be accessed based on receiving consumer interaction data indicating that the consumer device has accessed impression 800 (e.g., accessed an email message, webpage, application, etc.) without further accessing a promotion (e.g., for promotion details and/or purchase initiation) therein (e.g., via selection of a promotion 802-804 within impression display 800).

In response to determining that the consumer account accessed the impression, method 500 may proceed to 518, where server 110 may be configured to determine whether the impression has received a subsequent consumer interaction by the consumer account. For example, server 110 may be configured to determine whether the impression received a subsequent consumer interaction within a predetermined time. The subsequent consumer interaction may include any of the consumer interaction types discussed herein, among others.

In response to determining that the impression has received a subsequent consumer interaction, method 500 may return to 504, where server 110 may be configured to determine an impression score based on the subsequent consumer interaction. In response to determining that the impression has failed to receive a subsequent consumer interaction, method 500 may proceed to 520, where server 110 may be configured to determine the impression score of the impression as a fourth interaction value indicating a moderate lack of consumer interest in the promotion. The fourth interaction value may be configured to indicate a lower consumer interest than the first, second, and third interaction values. In some embodiments, interaction values associated with a lack of consumer interest (e.g., the fourth interaction value) may be negative and interaction values associated with a positive consumer interest (e.g., the first, second, and third interaction values) may be positive, or vice versa.

Returning to 516, in response to determining that the consumer account has failed to access the impression, method 500 may proceed to 522, where server 110 may be configured to determine the impression score of the impression as a fifth interaction value indicating neutral consumer interest. For example, the fifth interaction value may be larger than the fourth interaction value and smaller than the first, second and third interaction values. In some embodiments, the fourth interaction value, as well as any other interaction values associated with consumer interaction types providing no evidence of consumer interest in the promotion may be 0 and/or otherwise configured to not influence the promotion score. Method 500 may then proceed to 524 and end.

FIG. 6 shows an example of a method 600 for determining a promotion score as an interest score and exploration score, in accordance with some embodiments. Method 600 may be performed to determine an interest score for a promotion based on impression scores of one or more impressions including the promotion. As discussed in greater detail herein, in some embodiments, the interest score of a promotion may be based on impression scores of other (e.g., related) promotions and their associated consumer interaction data. Additionally or alternatively, in some embodiments, method 600 may be performed to determine an exploration score for a promotion based on the confidence of the interest scores. For example, an interest associated with a larger volume of consumer interaction data (e.g., previously sent via impressions) may result in larger confidence scores, and lower exploration scores. Server 110 may be further configured to determine a selected promotion for providing to the consumer device based on (e.g., lowest) exploration scores.

Method 600 may begin at 602 and proceed to 604, where server 110 may be configured to determine, based on aggregated consumer interaction data (e.g., from multiple and/or all consumers), impression scores associated with consumer interaction types using some or all of the techniques described above.

At 606, server 110 may be configured to determine, based on consumer interaction data associated with a consumer, a consumer interaction type associated with each consumer interaction with a promotion. The promotion, for example, may be the promotion under consideration for selection as discussed at 310-312 of method 300.

At 608, server 110 may be configured to determine a promotion score of the promotion based on the impression score associated with each consumer interaction type of each consumer interaction. For example, server 110 may be configured to determine the promotion score as an average of the impression scores of each consumer interaction.

At 610, server 110 may be configured to determine a promotion category associated with the promotion. In some embodiments, server 110 may be configured to aggregate consumer interaction data based on promotion category. Impressions of promotions in the same promotion category may have similar effects as a repeated promotion. Promotions including the same or similar underlying products, experiences, or services may be associated with a common promotion category. Additionally or alternatively, server 110 may aggregate consumer interaction data based on promotion merchant, price, among other things.

At 512, server 110 may be configured to determine one or more other promotions associated with the promotion category. The one or more other promotions may include promotions that have been provided to the consumer account.

At 514, server 110 may be configured to determine the promotion score of the promotion based on consumer interaction data associated with one or more other promotions. The promotion score may be based on the impression scores associated with the impressions of the one or more promotions of the promotion category. For example, when promotion category aggregation is utilized, the promotion score may be determined as an average of the impression scores for each consumer interaction of the promotion and of the one or more other promotions of the promotion category. In some embodiments, promotion scores may be normalized to depend on the consumer interaction types and their proportions rather than the total quantity of consumer interactions.

At 616, server 110 may be configured to determine a confidence score for the promotion score. The confidence score may depend on the total quantity of consumer interactions which are used to determine the promotion score. For example, the larger the sampling of relevant consumer interaction data, the larger the confidence score.

At 618, server 110 may be configured to determine an exploration score for the promotion based on the confidence score. In some embodiments, the exploration score may be defined as 1—confidence score. In that sense, promotions lacking in consumer interaction data (e.g., in a cold start scenario for the promotion) may be determined as selected promotions based on the exploration score. Method 600 may then proceed to 620 and end.

FIG. 7 shows an example of a method 700 for determining a promotion score of a promotion as an impact score, in accordance with some embodiments. The impact score may indicate a programmatically determined likelihood or probability that impressions of the promotion that have been provided to the consumer will generate a (e.g., future) purchase and/or redemption. In some embodiments, the impact score may be inversely proportional to the promotion score such that server 110 will be more programmatically likely to provide impressions of promotions having a lower impact score and higher promotion score. Based on the impact score, a promotion may be repeated to a consumer when there is a lower likelihood that previously sent impressions of the promotion will still result in a purchase. Similarly, when there is a high likelihood that one or more impressions of a promotion may result in a purchase based on the impact score, the promotion may be not repeated (e.g., until a subsequent time). In that sense, the diminishing returns of sending repeat promotions may be avoided (e.g., via providing impressions of other targeted promotions).

Method 700 may begin at 702 and proceed to 704, where server 110 may be configured to determine, based on aggregated consumer interaction data, a funnel delay distribution indicating a relationship between consumer access times of impressions of promotions provided to consumer devices and consumer purchase times of the promotions. At 706, server 110 may be configured to determine, based on the funnel delay distribution, a purchase delay threshold time. The discussion at 404-406 of method 400 may be applicable at 506-508.

At 708, server 110 may be configured to determine a purchase score for the promotion indicating a probability that the promotion has been purchased via impressions provided to the consumer account having an impression time since sent that fails to exceed the purchase delay threshold time. For example, server 110 may be configured to determine, from each impression provided to the consumer, qualifying impressions that include an impression time since sent that fails to exceed the purchase delay threshold. Server 110 may compare the send and/or access times of the impressions with the current time to determine the impression time since sent. The impression time since sent may be compared with the purchase delay threshold for each promotion and the qualifying promotions may be selected. Server 110 may be further configured to determine a cumulative distribution based on the impression time since sent for each promotion (e.g., for the current time) to determine the purchase score.

At 710, server 110 may be configured to determine the promotion score and an impact score based on the purchase score for the promotion. For example, in some embodiments, the impact score may be determined as being inversely proportional to the purchase score. In that sense, the impact score may relate inversely with the likelihood that a promotion will be purchased based on previously provided impressions. Server 110 may be configured to select promotions based, at least in part, on the impact score such that subsequent impressions may include promotions that are less likely to suffer diminishing returns from the previously provided impressions of promotions.

Via method 700, server 110 may be configured to determine the promotion score discussed above with respect to method 300 as and/or based on the impact score. For example, the promotion score may be inversely proportional to the impact score. Server 110 may be configured to determine the selected promotion based on higher promotion score and/or low impact score relative to other available promotions. In some embodiments, such as for promotion-consumer pairs without consumer interaction data, the promotion and/or impact score may be set to a default value (e.g., to 1). Method 700 may then proceed 714 and end.

CONCLUSION

Many modifications and other embodiments will come to mind to one skilled in the art to which these embodiments pertain having the benefit of the teachings presented in the foregoing descriptions and the associated drawings. Therefore, it is to be understood that embodiments and implementations are not to be limited to the specific example embodiments disclosed and that modifications and other embodiments are intended to be included within the scope of the appended claims. Although specific terms are employed herein, they are used in a generic and descriptive sense only and not for purposes of limitation.

The invention claimed is:

1. A system comprising, comprising:
one or more servers including:
 communication circuitry configured to connect with consumer devices via a network; and
 processing circuitry configured to:
  provide impressions of a promotion to the consumer devices via the network, wherein:
   each of the impressions is associated with a respective electronic interface configured to facilitate creation of consumer interaction data via consumer device inputs;
   the respective electronic interface provides for a plurality of consumer interaction types for the consumer device inputs; and
   each consumer interaction type is associated with a different interaction value;
  receive, via the network, consumer interaction data from the consumer devices indicating consumer interaction with the impressions;
  determine an impression score for each of the impressions based on the consumer interaction data, wherein the determination includes determining a first impression score for a first impression displayed via a first electronic interface by:
   determining a consumer interaction type associated with the consumer interaction data based on a type of communication channel associated with the consumer interaction data and a display position of a particular promotion for the first impression with respect to one or more other promotions concurrently displayed with the particular promotion via the first electronic interface, wherein the type of communication channel associated with the consumer interaction type is determined from a plurality of communication channel types and the display position associated with the consumer interaction type is determined from a plurality of display positions with respect to the first electronic interface;
   determining an interaction value associated with the consumer interaction type by at least:
    determining, based on the type of communication channel associated with the consumer interaction data and the display position of the particular promotion associated with the consumer interaction data, a funnel delay distribution indicating a relationship between consumer access times of the impressions and consumer purchase times of the promotion, wherein the funnel delay distribution is associated with a distribution of per-promotion purchase delay times between the consumer access times and the consumer purchase times across the consumer interaction data received from the consumer devices;
    determining, based on the funnel delay distribution, a purchase delay threshold time, wherein the purchase delay threshold time is associated with a first per-promotion purchase delay time of the per-promotion purchase delay times, and wherein the first per-promotion purchase delay time is associated with a threshold ratio of the consumer devices as indicated by the distribution of per-promotion purchase delay times associated with the funnel delay distribution; and
    determining the interaction value associated with the consumer interaction type based on the purchase delay threshold time; and
   determining the first impression score of the first impression based on the interaction value;
  determine a promotion score of the promotion based on the impression score for each of the impressions;
  determine a selected promotion based on a comparison between the promotion score of the promotion and one or more other promotion scores associated with the one or more other promotions;
  subsequent to the selected promotion being determined, generate an impression of the selected promotion;
  select a communication channel associated with the network for the impression; and
 provide, via the communication channel associated with the network, the impression of the selected promotion to the display position with respect to an electronic interface of a consumer device.

2. The system of claim 1, wherein the processing circuitry configured to determine the promotion score of the promotion includes the processing circuitry being configured to:
 determine, based on the purchase delay threshold time, a purchase score indicating a probability that the promotion has been purchased via one or more impressions of the promotion provided to the consumer device; and
 determine the promotion score of the promotion based on the purchase score of promotion.

3. The system of claim 1, wherein the processing circuitry is further configured to:
 determine a promotion category associated with the promotion; and
 determine the promotion score of the promotion based on other consumer interaction data associated with the one or more other promotions.

4. The system of claim 1, wherein the processing circuitry is further configured to:
 determine a confidence score of the promotion score;

determine an exploration score of the promotion based on the confidence score; and determine a second selected promotion based on a comparison between the exploration score of the promotion and one or more other exploration scores associated with the one or more other promotions.

5. The system of claim 1, wherein:

the plurality of consumer interaction types is generated based on first purchase data associated with a promotion purchase and second purchase data associated with an initiation of the promotion purchase; and the processing circuitry configured to determine the first impression score includes the processing circuitry being configured to:

determine whether a consumer account associated with the consumer device is associated with the first purchase data via a second impression of the impressions;

in response to determining that the consumer account has purchased the promotion via the second impression, determine the first impression score of the first impression as a first interaction value;

determine whether the consumer account is associated with the second purchase data via the second impression; and in response to determining that the consumer account has initiated purchase of the promotion via the second impression without purchasing the promotion, determine the first impression score of the first impression as a second interaction value, wherein the second interaction value indicates a lower level of consumer interest than the first interaction value.

6. The system of claim 5, wherein:

the plurality of consumer interaction types includes a promotion access without the initiation of the promotion purchase; and the processing circuitry configured to determine the first impression score includes the processing circuitry being configured to:

determine whether the promotion has been accessed via the second impression by the consumer account without initiating the promotion purchase; and in response to determining that the promotion has been accessed via the second impression without initiating the promotion purchase, determine the first impression score as a third interaction value, wherein the third interaction value indicates a lower level of consumer interest than the first interaction value and the second interaction value.

7. The system of claim 6, wherein:

the plurality of consumer interaction types includes an impression access without the promotion access; and the processing circuitry configured to determine the first impression score includes the processing circuitry being configured to:

determine whether the second impression has been accessed by the consumer account without the promotion access; and in response to determining that the second impression has been accessed without the promotion access, determine whether the second impression has received a subsequent consumer interaction by the consumer account; and in response to determining that the second impression has failed to receive the subsequent consumer interaction, determine the impression score of the second impression as a fourth interaction value, wherein the fourth interaction value indicates a lower level of consumer interest than the first interaction value, the second interaction value, and the third interaction value.

8. The system of claim 7, wherein the processing circuitry configured to determine the first impression score includes the processing circuitry being configured to, in response to determining that the second impression has failed to be accessed, determine the impression score of the second impression as a fifth interaction value, wherein the fifth interaction value indicates a lower level of consumer interest than the first interaction value, the second interaction value, and the third interaction value and a higher level of consumer interest than the fourth interaction value.

9. The system of claim 8, wherein:

the initiation of the promotion purchase without purchasing the promotion includes selection of a buy button within a promotion display without a subsequent selection of a confirm purchase button;

the promotion access without the initiation of promotion purchase includes selection of the promotion within an impression display without a subsequent selection of the buy button within the promotion display; and the impression access without the promotion access includes an access of the impression display without a selection of the promotion within the impression display.

10. A machine-implemented method, comprising:

providing, by circuitry of one or more servers connected with consumer devices via a network, impressions of a promotion to consumer devices, wherein:

each of the impressions is associated with a respective electronic interface configured to facilitate creation of consumer interaction data via consumer device inputs;

the respective electronic interface provides for a plurality of consumer interaction types for the consumer device inputs; and each consumer interaction type associated with a different interaction value;

receiving, by the circuitry and via the network, consumer interaction data from the consumer devices indicating consumer interactions with the impressions;

determining, by the circuitry, an impression score for each of the impressions based on the consumer interaction data, wherein the determination includes determining a first impression score for a first impression displayed via a first electronic interface by:

determining a consumer interaction type associated with the consumer interaction data based on a type of communication channel associated with the consumer interaction data and a display position of a particular promotion for the first impression with respect to one or more other promotions concurrently displayed with the particular promotion via the first electronic interface, wherein the type of communication channel associated with the consumer interaction type is determined from a plurality of communication channel types and the display position associated with the consumer interaction type is determined from a plurality of display positions with respect to the first electronic interface;

determining an interaction value associated with the consumer interaction type by at least:

determining, based on the type of communication channel associated with the consumer interaction data and the display position of the particular promotion associated with the consumer interaction data, a funnel delay distribution indicating a relationship between consumer access times of the impressions and consumer purchase times of the promotion, wherein the funnel delay distribution is associated with a distribution of per-promotion purchase delay times between the consumer access times and the consumer purchase times across the consumer interaction data received from the consumer devices;
  determining, based on the funnel delay distribution, a purchase delay threshold time, wherein the purchase delay threshold time is associated with a first per-promotion purchase delay time of the per-promotion purchase delay times, and wherein the first per-promotion purchase delay time is associated with a threshold ratio of the consumer devices as indicated by the distribution of per-promotion purchase delay times associated with the funnel delay distribution; and
  determining the interaction value associated with the consumer interaction type based on the purchase delay threshold time; and
 determining the first impression score of the first impression based on the interaction value;
determining, by the circuitry, a promotion score of the promotion based on the impression score for each of the impressions;
determining, by the circuitry, a selected promotion based on a comparison between the promotion score of the promotion and one or more other promotion scores associated with the one or more other promotions;
subsequent to determining the selected promotion, generating, by the circuitry, an impression of the selected promotion;
selecting, by the circuitry, a communication channel associated with the network for the impression; and
providing, by the circuitry and via the communication channel associated with the network, the impression of the selected promotion to the display position with respect to an electronic interface of a consumer device.

11. The method of claim 10, wherein determining the promotion score of the promotion includes:
determining, based on the purchase delay threshold time, a purchase score indicating a probability that the promotion has been purchased via one or more impressions of the promotion provided to the consumer device; and
determining the promotion score of the promotion based on the purchase score of the promotion.

12. The method of claim 10 further comprising:
determining a promotion category associated with the promotion; and
determining the promotion score of the promotion based on other consumer interaction data associated with the one or more other promotions.

13. The method of claim 10 further comprising:
determining a confidence score of the promotion score;
determining an exploration score of the promotion based on the confidence score; and
determining a second selected promotion based on a comparison between the exploration score of the promotion and one or more other exploration scores associated with the one or more other promotions.

14. The method of claim 10, wherein:
the plurality of consumer interaction types is generated based on first purchase data associated with a promotion purchase and second purchase data associated with an initiation of the promotion purchase; and
determining the first impression score includes:
determining whether a consumer account associated with the consumer device is associated with the first purchase data via a second impression of the impressions;
in response to determining that the consumer account has purchased the promotion via the second impression, determining the first impression score of the first impression as a first interaction value;
determining whether the consumer account is associated with the second purchase data via the second impression; and
in response to determining that the consumer account has initiated purchase of the promotion via the second impression without purchasing the promotion, determining the first impression score of the first impression as a second interaction value, wherein the second interaction value indicates a lower level of consumer interest than the first interaction value.

15. The method of claim 14, wherein:
the plurality of consumer interaction types includes a promotion access without the initiation of the promotion purchase; and
determining the first impression score includes:
determining whether the promotion has been accessed via the second impression by the consumer account without initiating the promotion purchase; and
in response to determining that the promotion has been accessed via the second impression without initiating the promotion purchase, determining the first impression score as a third interaction value, wherein the third interaction value indicates a lower level of consumer interest than the first interaction value and the second interaction value.

16. The method of claim 15, wherein:
the plurality of consumer interaction types includes an impression access without the promotion access; and
determining the first impression score includes:
determining whether the second impression has been accessed by the consumer account without the promotion access; and
in response to determining that the second impression has been accessed without the promotion access, determining whether the second impression has received a subsequent consumer interaction by the consumer account; and
in response to determining that the second impression has failed to receive the subsequent consumer interaction, determining the impression score of the second impression as a fourth interaction value, wherein the fourth interaction value indicates a lower level of consumer interest than the first interaction value, the second interaction value, and the third interaction value.

17. The method of claim 16, wherein determining the first impression score includes, in response to determining that the second impression has failed to be accessed, determining the impression score of the second impression as a fifth interaction value, wherein the fifth interaction value indicates a lower level of consumer interest than the first interaction value, the second interaction value, and the third interaction value and a higher level of consumer interest than the fourth interaction value.

18. The method of claim 17, wherein:
the initiation of the promotion purchase without purchasing the promotion includes selection of a buy button within a promotion display without a subsequent selection of a confirm purchase button;

the promotion access without the initiation of promotion purchase includes selection of the promotion within an impression display without a subsequent selection of the buy button within the promotion display; and the impression access without the promotion access includes an access of the impression display without a selection of the promotion within the impression display.

19. A computer program product comprising a non-transitory computer readable storage medium and computer program instructions stored therein, the computer program instructions comprising program instructions for:

providing, by circuitry of an apparatus connected with consumer devices via a network, impressions of a promotion to consumer devices, wherein:

each of the impressions is associated with a respective electronic interface configured to facilitate creation of consumer interaction data via consumer device inputs;

the respective electronic interface provides for a plurality of consumer interaction types for the consumer device inputs; and each consumer interaction type is associated with a different interaction value;

receiving, by the circuitry and via the network, consumer interaction data from the consumer devices indicating consumer interactions with the impressions;

determining, by the circuitry, an impression score for each of the impressions based on the consumer interaction data, wherein the determination includes determining a first impression score for a first impression displayed via a first electronic interface by:

determining a consumer interaction type associated with the consumer interaction data based on a type of communication channel associated with the consumer interaction data and a display position of a particular promotion for the first impression with respect to one or more other promotions concurrently displayed with the particular promotion via the first electronic interface, wherein the type of communication channel associated with the consumer interaction type is determined from a plurality of communication channel types and the display position associated with the consumer interaction type is determined from a plurality of display positions with respect to the first electronic interface;

determining an interaction value associated with the consumer interaction type by at least:

determining, based on the type of communication channel associated with the consumer interaction data and the display position of the particular promotion associated with the consumer interaction data, a funnel delay distribution indicating a relationship between consumer access times of the impressions and consumer purchase times of the promotion, wherein the funnel delay distribution is associated a distribution of per-promotion purchase delay times between the consumer access times and the consumer purchase times across the consumer interaction data received from the consumer devices;

determining, based on the funnel delay distribution, a purchase delay threshold time, wherein the purchase delay threshold time is associated with a first per-promotion purchase delay time of the per-promotion purchase delay times, and wherein the first per-promotion purchase delay time is associated with a threshold ratio of the consumer devices as indicated by the distribution of per-promotion purchase delay times associated with the funnel delay distribution; and determining the interaction value associated with the consumer interaction type based on the purchase delay threshold time; and determining the first impression score of the first impression based on the interaction value;

determining, by the circuitry, a promotion score of the promotion based on the impression score for each of the impressions;

determining, by the circuitry, a selected promotion based on a comparison between the promotion score of the promotion and one or more other promotion scores associated with the one or more other promotions;

subsequent to determining the selected promotion, generating, by the circuitry, an impression of the selected promotion;

selecting, by the circuitry, a communication channel associated with the network for the impression; and providing, by the circuitry and via the communication channel associated with the network, the impression of the selected promotion to the display position with respect to an electronic interface of a consumer device.

* * * * *